Feb. 11, 1958 C. WASINGER 2,822,740
LAWN TRIMMING TOOLS
Filed Sept. 16, 1955

INVENTOR.
Carl Wasinger
BY
ATTORNEY

United States Patent Office 2,822,740
Patented Feb. 11, 1958

2,822,740
LAWN TRIMMING TOOLS

Carl Wasinger, Fort Collins, Colo.

Application September 16, 1955, Serial No. 534,697

2 Claims. (Cl. 97—227)

This invention relates to a lawn trimming tool and has for its principal object the provision of a small, compact, easily used lawn trimming tool which can be pushed along the edge of a sidewalk or curb and which will act to trim the sod and the grass to a neat, sharp, straight line along the walk.

Many conventional lawn trimming tools are designed to form a trench or ditch along the sidewalk or curb. These trenches and ditches soon fill with dirt, cut grass, weed seeds, etc. to present a very unsightly appearance. They also are a liability to children riding tricycles and other vehicles and to pedestrians especially with high heels. Another object of this invention is to provide a lawn tool which will cut away but a minimum of sod so that the inconveniences caused by trenches will be avoided.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

Figures 1, 2, 3:
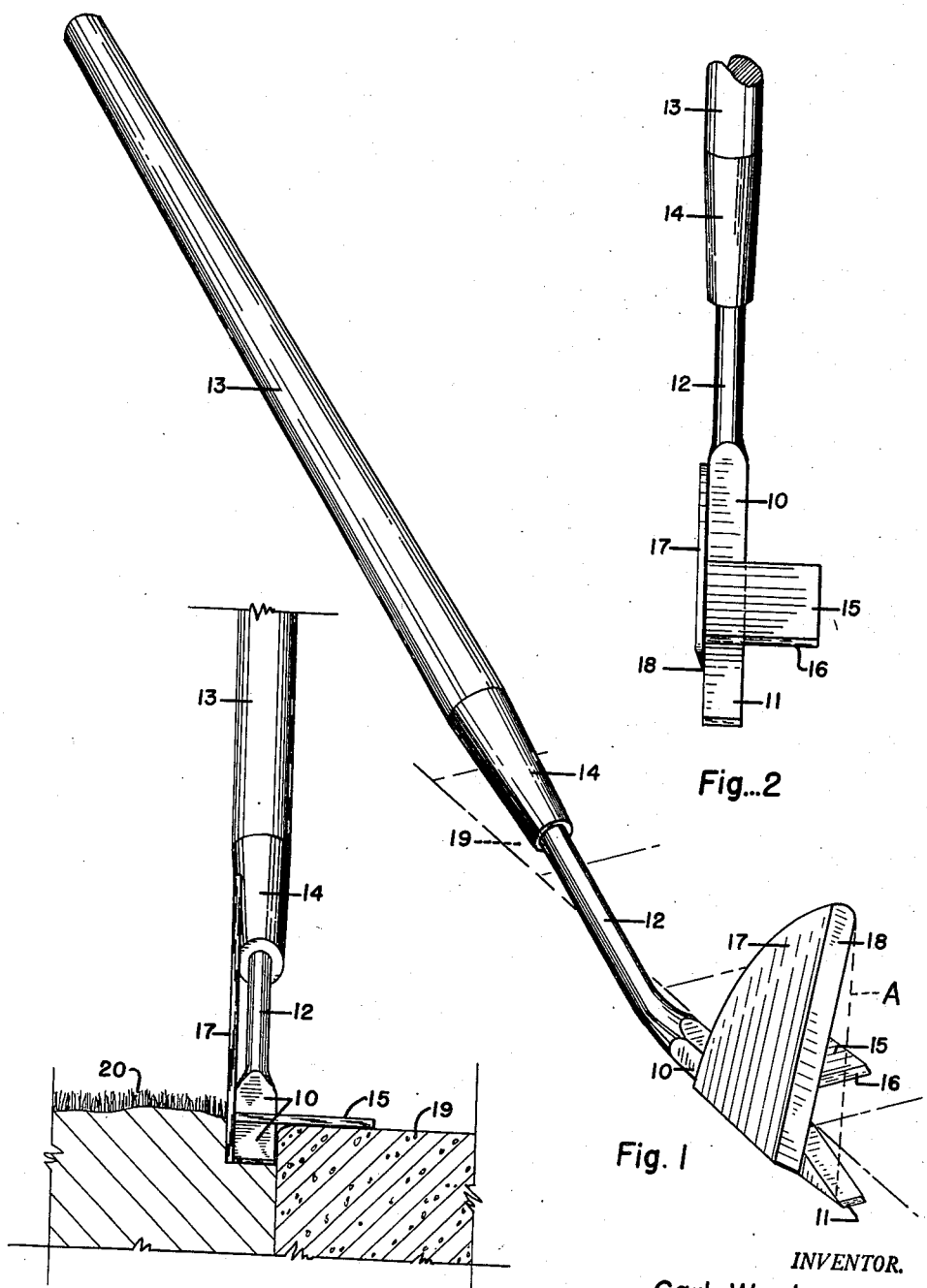
Fig. 1 is a perspective view of the improved lawn trimming tool, illustrating it as it would appear in use.
Fig. 2 is a top view thereof with the handle portion broken away.
Fig. 3 is a front view thereof illustrating its appearance when in use.

The improved tool comprises a straight, horizontal bar portion 10 of square cross section preferably formed from a half-inch square bar. The forward extremity of the bar portion 10 is inclined downwardly to an intersection with the bottom side thereof to form a sharp forward edge at the bottom of the bar with an inclined surface extending rearwardly therefrom. The extremity of the bar portion 10 is welded or otherwise formed on a rod-like shank portion 12 which extends rearwardly and upwardly at an acute angle to the horizontal. The shank portion 12 is embedded in a ferrule 14 on the extremity of a handle 13.

A horizontal gauge plate 15 is welded or otherwise secured to the upper surface of the bar 10 and extends sidewardly, preferably to the left, from the bar. The front edge of the gauge plate is inclined as shown at 16 and this incline aligns with the inclined surface of the sharpened point of the bar 10.

A vertical knife blade 17 is welded or otherwise secured to the outer side face of the bar 10, preferably the right side face, and terminates flush with the bottom of the latter. The rear edge of the knife blade 17 is arcuately formed and extends upwardly and forwardly. The front edge of the knife is beveled on its outer surface to form a sharpened knife edge 18 immediately alongside of the bar 10. The shape of the blade 17 is such that the knife edge 18 inclines forwardly so that its upper extremity is positioned substantially over the sharpened edge 11 when the bar 10 is in a horizontal position, as indicated by the broken line A in Fig. 1. The sharpened edge 18 of the blade 17 is positioned along the bar 10 at a point rearward of the sharpened edge 11 and forward of the gauge plate 15.

In use, the bar 10 is placed alongside of a curb or sidewalk, such as indicated at 19 on the drawing, with the gauge plate 15 resting upon the walk. The bar is then forced forwardly by means of the handle 13 causing the sharpened edge 11 to enter and travel through the sod, as indicated in Fig. 3, alongside the sidewalk and to cause the sharpened edge 18 of the knife blade 17 to cut the sod, grass and roots in a vertical plane parallel to the sidewalk. A small area of sod extending one-half inch beyond the sidewalk will be gradually raised, cut away and rolled over on the walk as the tool progresses along the walk. The blade 17 is sufficiently high and the edge 18 is sufficiently sharp to cut all grass, weeds and other plants in a vertical plane alongside the walk so that they will not overhang the edge of the walk to interfere with the neat tailored appearance created by the improved lawn trimming tool. The forward incline of the sharpened edge 18 acts to work the grass blades downwardly as the tool advances to compact them against the blade 17.

It will be noted that a slight trench is formed alongside the walk, however, this trench extends only one-half inch below and one-half inch beyond the walk so as to be substantially invisible. While the tool has been described with the gauge plate 15 projecting to the left and the cutting blade 17 on the right, it could, of course, be formed oppositely, that is, with the gauge plate 15 on the right and the cutting blade 17 on the left. However, the design illustrated is more convenient for right handed use.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:

1. A lawn trimming tool comprising: a horizontal square bar adapted to be positioned against the edge of a sidewalk; a gauge plate secured to the upper surface of said bar and extending sidewardly and adapted to rest on the top of a sidewalk; a cutting blade secured on the outer side of said square bar and extending vertically therefrom; an inclined upper surface formed on the forward extremity of said square bar terminating in a transverse sharp edge in alignment with the lower surface of said bar; a cutting edge formed on the vertical forward edge of said vertical blade; the forward edge of the lower portion of said cutting blade being positioned rearwardly of said transverse sharp edge and means for forcing said square bar forwardly alongside a sidewalk.

2. A lawn trimming tool as described in claim 1 in which the forward edge of said cutting blade is inclined forwardly and upwardly to a position substantially above the sharp forward extremity of said square bar.

References Cited in the file of this patent

UNITED STATES PATENTS

| | | |
|---|---|---|
| 709,976 | Fernstrom | Sept. 30, 1902 |
| 1,331,750 | Fulton | Feb. 24, 1920 |
| 1,891,066 | Smith | Dec. 13, 1932 |
| 2,041,179 | Higbee | May 19, 1936 |